(12) United States Patent
Ota

(10) Patent No.: US 6,233,057 B1
(45) Date of Patent: May 15, 2001

(54) INFORMATION RECORDING APPARATUS

(75) Inventor: Yuichi Ota, Anjou (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 08/898,279

(22) Filed: Jul. 22, 1997

(30) Foreign Application Priority Data

Jul. 24, 1996 (JP) ................................. 8-195074

(51) Int. Cl.[7] ............................. B41B 15/00; B41J 15/00; G06F 15/00; H04N 1/04
(52) U.S. Cl. ...................... 358/1.13; 358/1.12; 358/1.14; 358/1.15; 358/498
(58) Field of Search ......................... 395/112, 101, 395/113, 114, 117, 111; 358/468, 296, 400, 405, 476, 1.13, 1.1, 1.14, 1.15, 1.18, 1.12

(56) References Cited

U.S. PATENT DOCUMENTS 5,282,050 * 1/1994 Ishizuka et al. ................. 358/400
5,550,614 * 8/1996 Motoyama ....................... 355/296

FOREIGN PATENT DOCUMENTS 2-193157   7/1990 (JP) .

* cited by examiner

Primary Examiner—Joseph Mancuso
Assistant Examiner—Twyler Lamb
(74) Attorney, Agent, or Firm—Oliff & Berridge, PLC

(57) ABSTRACT

An information recording apparatus receives information from an external device, and records the received information onto a predetermined record sheet. The information recording apparatus is provided with: a detection device for detecting whether the received information of one page is blank information; a mode selecting device for selecting one of a first mode, in which if the detection device detects the received information of one page is the blank information, a recording operation is operated for the received information of one page as a blank page, and a second mode, in which if the detection device detects the received information of one page is the blank information, the recording operation is not operated for the received information of one page and the recording operation is operated for the received information of a next page, which is next to the received information of one page and is not the blank information; and a recording process device for operating the recording operation according to one of the first mode and the second mode which is selected by the mode selecting device when the blank information is detected by the detection device.

9 Claims, 4 Drawing Sheets

INFORMATION RECORDING APPARATUS

BACKGROUND OF THE INVENTION

1. Field of the Invention

The present invention relates to an information recording apparatus such as a printer apparatus, capable of receiving information to be recorded on a record sheet and recording the received information onto both sides or only one side of the record sheet to thereby output it.

2. Description of the Related Art

There is an information recording apparatus such as a printer apparatus, which has a both sides recording function as well as a one side recording function. The both sides recording function is such a function to record, when information to be recorded onto a record sheet is received from an external device, such as a computer, a facsimile apparatus or the like, the received information onto both sides of the record sheet. The one side recording function is such a function to record the received information onto only one side of the record sheet. When this type of information recording apparatus performs the both sides recording operation, if the information indicating a blank page is received, this received information indicating the blank page is not recorded but the received information for a next page of the blank page is recorded on the surface (one of the sides) of the record sheet corresponding to the blank page, in order to save the record sheet.

Further, when the information to be recorded onto only one side of the record sheet is continuously received by this type of information recording apparatus while the both sides recording operation is performed, this received information to be recorded onto only one side in an information amount of 2 pages is uniformly recorded onto both sides of one record sheet in order to save the record sheet.

However, if, when the information to be recorded onto only one side of the record sheet is continuously received during the both sides recording operation, this received information to be recorded onto only one side in the information amount of 2 pages is uniformly recorded onto both sides of one record sheet in the above explained manner, there is raised such a problem that the blank page cannot be outputted against the user's intention in case that the user intends to output the blank page as it is which corresponds to the back page of the recorded page indicated by the received information to be recorded onto only one side of the record sheet.

Further, there is also such a problem that the total page number indicated by the received information (including the blank page) and the total page number of the actually recorded record sheets are not consistent with each other in case that the received information indicating the blank page is intended to be recorded as the blank page as it is.

SUMMARY OF THE INVENTION

It is therefore an object of the present invention to provide an information recording apparatus having the both sides recording function, which can prevent the received information from being recorded onto both sides of the record sheet against the user's intention in case that the user intends to record the received information while leaving the blank page indicated by the received information as the blank page of the record sheet, and which can prevent the total page number indicated by the received information and the total page number of the actually recorded record sheets from being inconsistent with each other.

The above object of the present invention can be achieved by an information recording apparatus for receiving information from an external device, and recording the received information onto a predetermined record sheet. The information recording apparatus is provided with: a detection device for detecting whether the received information of one page is blank information; a mode selecting device for selecting one of a first mode, in which if the detection device detects the received information of one page is the blank information, a recording operation is operated for the received information of one page as a blank page, and a second mode, in which if the detection device detects the received information of one page is the blank information, the recording operation is not operated for the received information of one page and the recording operation is operated for the received information of a next page, which is next to the received information of one page and is not the blank information; and a recording process device for operating the recording operation according to one of the first mode and the second mode which is selected by the mode selecting device when the blank information is detected by the detection device.

According to the information recording apparatus of the present invention, in advance of the recording operation, one of the first mode, such as a normal mode or the like, and the second mode, such as a saving mode or the like, is selected by the mode selecting device, such as a CPU, a mode selecting portion of an operation panel or the like. When the information is inputted from the external device, the information recording apparatus receives it. Then, it is detected by a detection device, such as a CPU or the like, whether the received information of one page is blank information or not. Then, if the first mode is selected, when the blank information is detected according to a detection result of the detection device, the recording operation is operated by the first mode by the recording process device. Thus, one side of the record sheet corresponding to the blank information is left blank. Alternatively, if the second mode is selected, when the blank information is detected according to the detection result, the recording operation is operated by the second mode by the recording process device. Thus, one side of the record sheet corresponding to the blank information is recorded by the received information of a next page, which is inputted after the received information of one page and is not the blank information.

Accordingly, it is possible to select either one of the first and second modes for the case of detecting the blank information, in advance. Thus, the first or second mode can be selected in accordance with the user's intention in advance, so that it is possible to prevent the received information from being recorded onto the both sides of the record sheet against the user's intention, in case that the user intends to record the received information while leaving the blank information in the received information inputted from the external device as a blank page or surface of the record sheet as it is.

It is also possible to prevent the total page number indicated by the received information inputted from the external device and the total page number of the actually recorded record sheets from being inconsistent with each other, in case that the user intends to record the received information while leaving the blank information in the received information inputted from the external device as a blank page or surface of the record sheet as it is.

Therefore, it is possible to improve the convenience of the information recording apparatus, such as a printer or the like, which has the both sides recording function.

In one aspect of the present invention, the received information is appended with an indicator indicating a segment of the received information of one page. And that, the detection device detects that the received information between two consecutive indicators is the blank information if the received information to be recorded does not exists between the two consecutive indicators.

According to this aspect, when the information is inputted from the external device, the information recording apparatus receives it. At this time, the received information is appended with the indicator indicating the segment of the received information of one page. Then, if the received information to be recorded does not exists between the two consecutive indicators, it is detected by the detection device that the received information between the two consecutive indicators is the blank information Accordingly, it is possible to certainly and reliably detect the blank information on the basis of the indicator.

In another aspect of the present invention, the recording process device includes a both sides recording device for recording the received information onto both sides of the record sheet.

According to this aspect, since the recording process device includes the both sides recording device, in case that the received information is to be recorded onto the both sides of the record sheet, the received information can be certainly recorded onto both sides of the record sheet.

In this case, the recording process device may further include a one side recording device for recording the received information onto only one side of the record sheet. And that, the information recording apparatus may be further provided with a both sides/one side selection device for selecting, in advance of a recording operation, one of the both sides recording device and the one side recording device.

According to this case, in advance of the recording operation, one of the both sides recording device and the one side recording device is selected by the both sides/one side selection device such as a CPU, a both sides/one side selection portion of an operation panel or the like. In case that the received information is to be recorded onto only one side of the record sheet, the received information can be certainly recorded onto only one side of the record sheet. Thus, in correspondence with the content of the received information, the one side recording process and the both side recording process can be selected by the user, and it is possible to save the record sheet by recording the received information onto the both sides of the record sheet according to the user's intention.

In another aspect of the present invention, the information is inputted from an external computer device. And that, the information recording apparatus is further provided with an I/O (Input/Output) interface for inputting the information from the external computer device into the apparatus.

According to this aspect, even if the information is inputted from the external computer device or devices such as a personal computer or the like, the recording operation can be precisely operated by the first mode or the second mode, which is selected in advance by the mode selection device according to the user's intention.

In another aspect of the present invention, the information is inputted from an external communication device. And that, the information recording apparatus is further provided with an I/O (Input/Output) interface for inputting the information from the external communication device into the apparatus.

According to this aspect, even if the information is inputted from the external communication device or devices such as a facsimile device or the like, the recording operation can be precisely operated by the first mode or the second mode, which is selected in advance by the mode selection device according to the user's intention.

In another aspect of the present invention, the information recording apparatus is further provided with a buffer memory device for temporarily storing the received information. And that, the detection device detects whether the received information which is stored in the buffer memory device is the blank information.

According to this aspect, during the recording operation, the received information is temporarily stored by the buffer memory device. Then, the detection process is performed by the detection device with respect to the received information stored in the buffer memory device, and the received information stored in the buffer memory device is recorded onto the record sheet. Thus, the recording operation can be certainly and reliably operated by the first mode or the second mode according to the user's intention.

In another aspect of the present invention, the information recording apparatus is further provided with a flag storage device for storing a flag indicating the detection result of the detection device. And that, the recording process device operates the recording operation on the basis of the flag stored in the flag storage device.

According to this aspect, when it is detected by the detection device whether the received information of one page is the blank information or not, a flag indicating the detection result of the detection device is stored in the flag storage device. Then, the recording operation is operated by the first mode or the second mode on the basis of the flag stored in the flag storage device. Thus, the recording operation can be certainly and reliably operated by the first mode or the second mode according to the user's intention.

In another aspect of the present invention, the mode selecting device is provided with an operation panel.

According to this aspect, one of the first mode and the second mode is selected by the operation panel. Thus, the first or second mode can be easily selected in accordance with the user's intention in advance of the recording operation.

In another aspect of the present invention, the mode selecting device selects one of the first mode and the second mode on the basis of a mode control information included in the received information from the external device.

According to this aspect, one of the first mode and the second mode is selected on the basis of the mode control information by the mode selecting device. Thus, the first or second mode can be easily selected in accordance with the user's intention through the external device.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained. It is explained hereinbelow a case of applying the present invention to a printer apparatus, as one example of the information recording apparatus, connected to a host computer for recording the record information processed and outputted by the host computer onto a predetermined record sheet.

(I) Construction of Printer Apparatus

First of all, a schematic construction of a printer apparatus to which the present invention is applied is explained with reference to FIG. 1.

Figure 1:
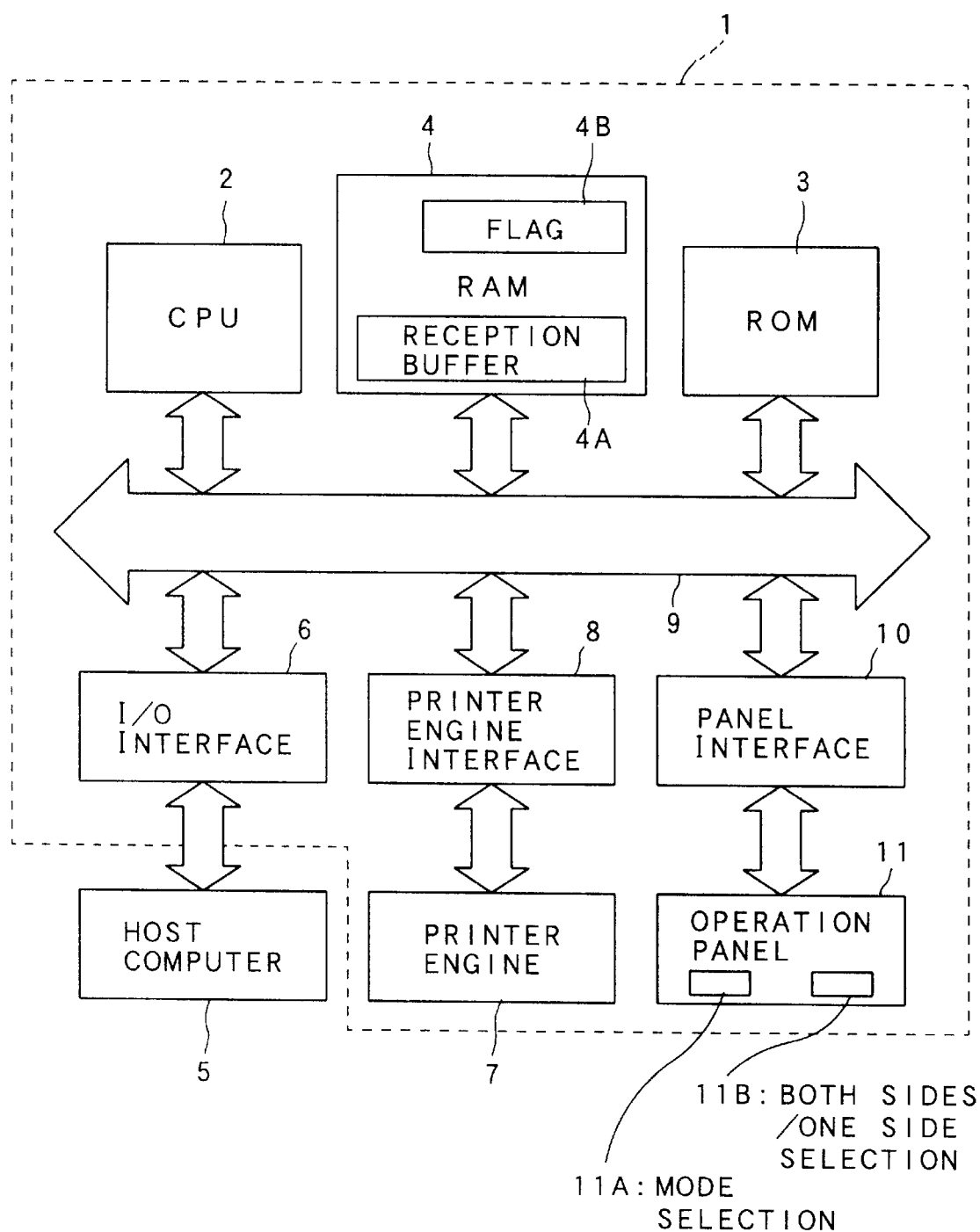
FIG. 1 is a block diagram of a printer apparatus for use in embodiments of the present invention.

In FIG. 1, a printer apparatus 1 as an embodiment of the present invention is provided with: a CPU (Central Processing Unit) 2; a RON (Read Only Memory) 3; a RAM (Random Access Memory) 4; an I/O (Input/Output) interface 6; a printer engine 7, such as a laser printer engine, an ink jet printer engine or the like; a printer engine interface 8; a communication bus 9; a panel interface 10; and an operation panel 11.

The RAM 4 includes a reception buffer 4A and a flag storage area 4B.

The operation panel 11 includes a mode selection portion 11A and a both sides/one side selection portion 11B.

Next, a whole operation of the printer apparatus 1 is explained.

The record information outputted from an external host computer 5 is inputted to the bus 9 through the I/O interface 6, which performs the interface operation with respect to the record information. At this time, the record information is inputted in such a state that a page flag indicating a segment of the record information, which is defined as a portion of the record information in the information amount of one page, is appended to each of the segment of the record information into the I/O interface 6. Only the page flag is inputted as for the segment of the record information corresponding to the blank page, and that the record information to be recorded is not inputted as for this blank page.

Then, the record information inputted to the bus 9 is temporarily stored in the reception buffer 4A in the RAM 4, and is treated as the received information hereinbelow, which includes a plurality of segments of the received information each having the information amount of one page.

After that, the CPU 2 executes a mode selecting process and a recording process etc. described later in detail by use of the flag storage area 4B, with respect to the received information stored in the reception buffer 4A, and outputs the processed result to the printer engine interface 8 through the bus 9. At this time, the control program to execute the mode selecting process and the recording process etc. is stored in advance in the ROM 3, so that it is read out to the CPU 2 through the bus 9 as the occasion demands.

After that, the received information, which is inputted to the printer engine interface 8, is outputted to the printer engine 7. For example, in case that the printer engine 7 is a laser printer engine, recording in correspondence with the received information is performed by driving a laser diode to emit a laser beam onto a photo-sensitive drum so that an electrostatic latent image corresponding to the received information is formed on the photo-sensitive drum, by applying toner etc. onto the electrostatic latent image and by transferring the toner onto a record sheet.

Incidentally, in the printer apparatus 1, either one of the both sides recording mode, in which the received information is recorded onto both sides of the record sheet, and the one side recording mode, in which the received information is recorded onto only one side of the record sheet, can be selected. This mode selection is performed in advance of the recording process by the both sides/one side selection portion 11B of the operation panel 11. The constructions to execute each of these two modes are the same as those in the conventional arts, and the detailed explanations thereof are omitted.

(II) Operation For Mode Selecting Process in First Embodiment

Figure 2:
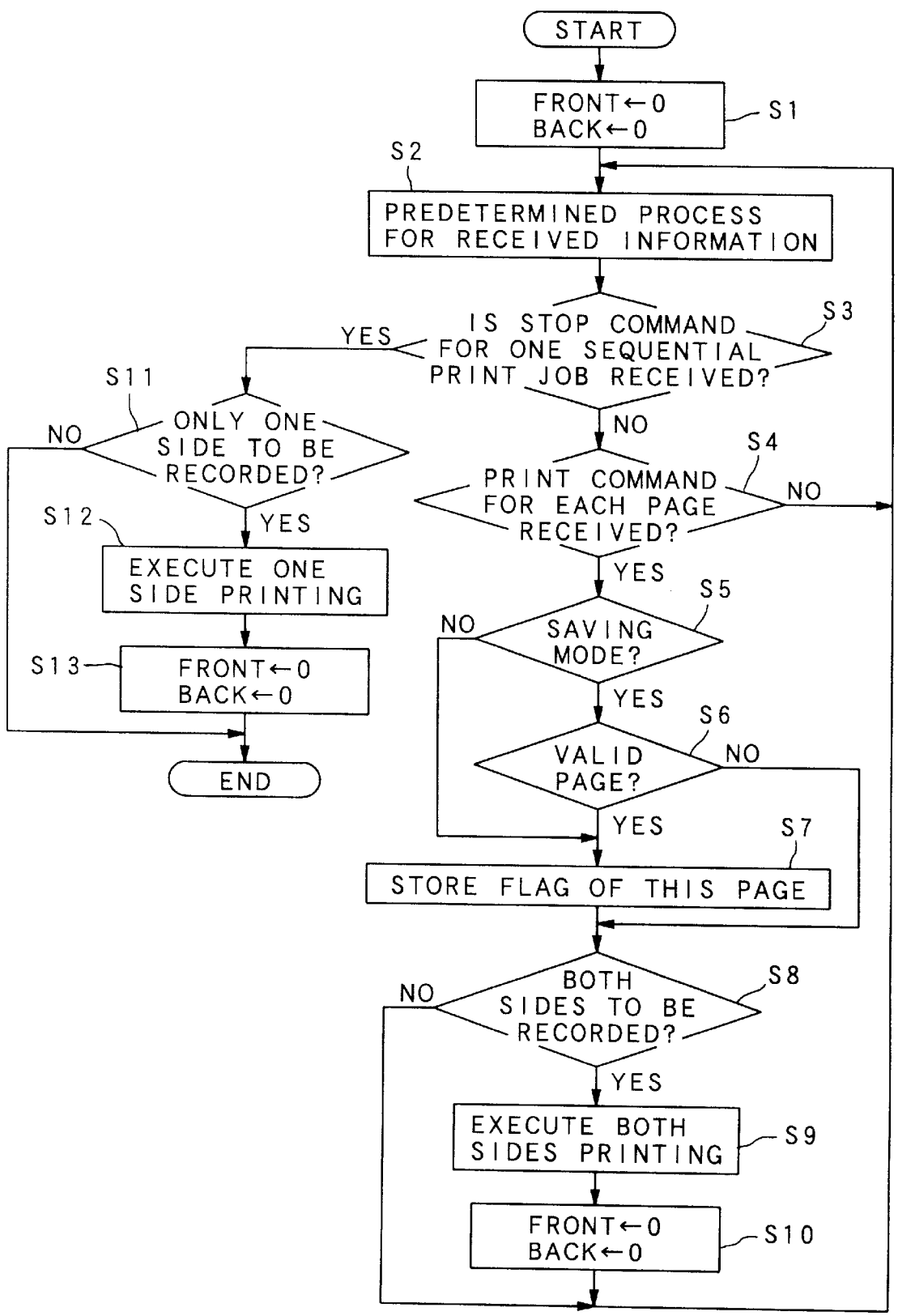
FIG. 2 is a flow chart showing a mode selecting process and a recording process in a first embodiment of the present invention.
Figure 3A:
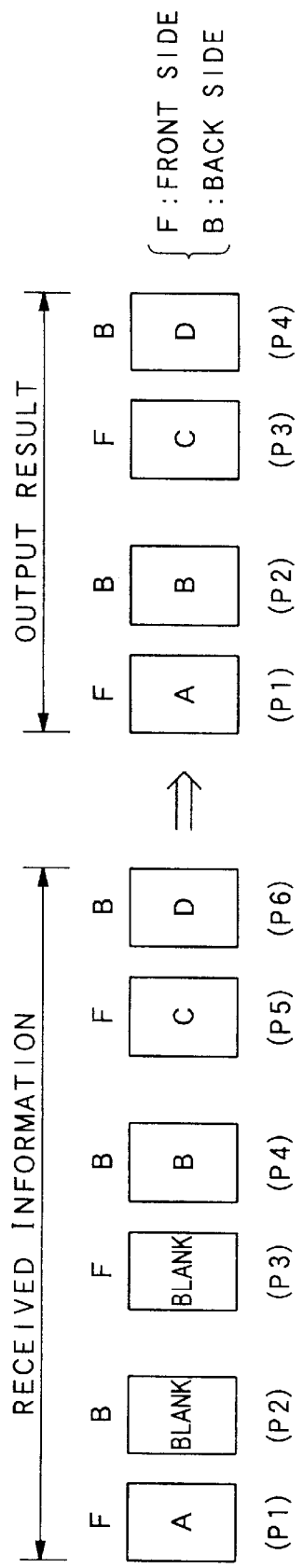
FIG. 3A is a diagram showing a relationship between received information and its output result in the first embodiment in case of a saving mode.
Figure 3B:
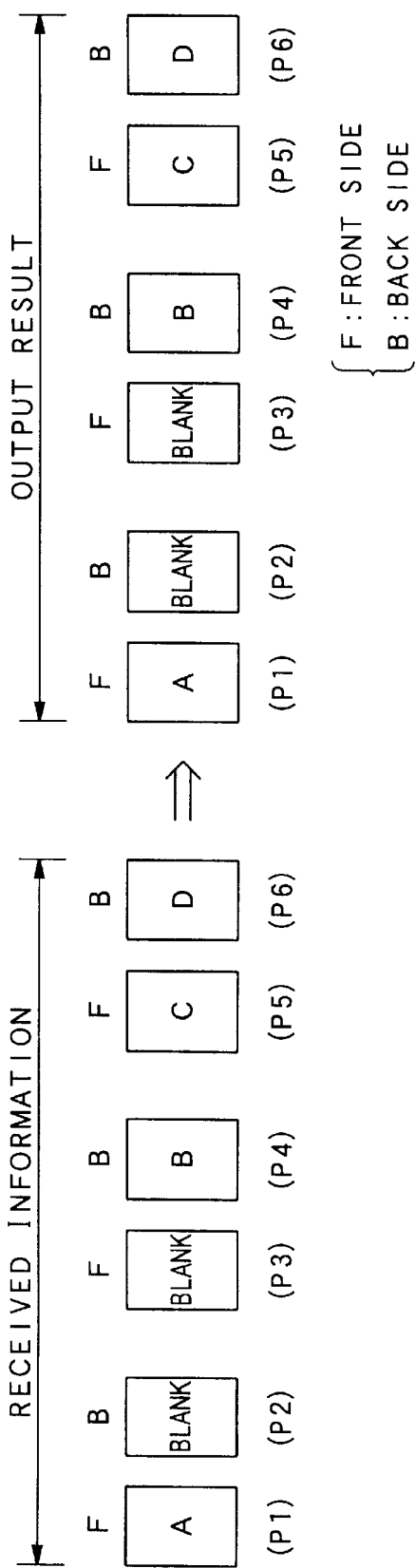
FIG. 3B is a diagram showing a relationship between received information and its output result in the first embodiment in case of a normal mode.

Next, the operation for the mode selecting process and the record process in a first embodiment is explained with reference to FIGS. 2, 3A and 3B. FIG. 2 is a flow chart of the operation, and each of FIGS. 3A and 3B is a diagram showing a relationship between the received information and the output result thereof (i.e. the state of record on the record sheet after the received information is processed and outputted for each page), wherein FIG. 3A corresponds to a case where the recording process is performed by a saving mode described later and FIG. 3B corresponds to a case where the recording process is performed by a normal mode described later. In FIG. 2, it is assumed that the both sides recording mode is selected by the both sides/one side selection portion 11B as a premised condition.

The processes, such as a judgment process and the like indicated in the flow chart of FIG. 2 are mainly executed by the CPU 2.

As shown in FIG. 2, in the mode selecting process and the recording process of the present embodiment, when the process is started, at first both of a FRONT flag and a BACK flag are initialized (step S1). The FRONT flag is a flag indicating whether or not there is the segment of the received information in the information amount of one page, which includes characters, graphics etc. to be recorded onto the front side of the record sheet in the received information. The BACK flag is a flag indicating whether or not there is the segment of the received information in the information amount of one page, which includes characters, graphics etc. to be recorded onto the back side of the record sheet in the received information. These FRONT flag and BACK flag are stored in the flag storage area 4B of the RAM 4.

When the initialization of each flag is finished (step S1), a predetermined process for the received information, such as a process for developing the segment of the received information for each page to bit map data having a data size corresponding to one page of the record sheet, with respect to the received information temporarily stored in the reception buffer 4A, is performed (step S2).

When the predetermined process for the received information is completed (step S2), it is judged whether or not a stop command to stop one sequential print job (e.g., a recording process corresponding to a record output for 10 pages in case that the information for 10 pages is received) is received from the host computer 5 (step S3). If the stop command is not received (step S3: NO), it is judged whether or not a print command for each page, which indicates to record and output the received information for each page, is received from the host computer 5 (step S4). Then, if the print command is not received (step S4: NO), the operation flow returns to the step S2, so as to perform the predetermined process for the received information with respect to the segment of the received information corresponding to the next page. On the other hand, if the print command is received (step S4: YES), it is judged whether the recording mode, which is currently selected, is the saving mode or the normal mode other than the saving mode (step S5). Incidentally, the print command is inputted from the host computer 5 even if the segment of the received information is the blank information indicating a blank page, in the judgment of the step S4.

Here, either one of the normal mode and the saving mode is selected as the recording mode, in advance of executing the print job with respect to one block of the received information; by the mode selection portion 11A of the operation panel 11 by the user. The normal mode is such a mode that, in case that the received information corresponding to one original copy having the record information to be recorded onto only one side of the record sheet is intermingled with the received information corresponding to another original copy having the record information to be recorded onto both sides of the record sheet, the received information to be recorded onto only one side of the record sheet is actually recorded onto only one side of the record sheet, and the back side with respect to this recorded side of the record sheet is outputted as the blank page, in the both sides recording mode. On the other hand, the saving mode is such a mode that, in case that the received information corresponding to one original copy having the record information to be recorded onto only one side of the record sheet is intermingled with the received information corresponding to another original copy having the record information to be recorded onto both sides of the record sheet, the received information to be recorded onto only one side is recorded onto one side of the record sheet, and the received information corresponding to the next page of this recorded side is recorded onto the back side of this recorded side in the both sides recording mode, so as to save the record sheet.

According to the judgment at the step S5, if the normal mode is selected (step S5: NO), either one of the FRONT flag and the BACK flag, which is related to the page corresponding to the print command received at the step S4 (i.e., the FRONT flag or the BACK flag which has never been updated or re-written so far), is updated to "1" (step S7), and the operation flow proceeds to a step S8.

On the other hand, according to the judgment at the step S5, if the saving mode is selected (step S5: YES), it is judged by the CPU 2 whether or not there is the segment of the received information to be recorded as the page corresponding to the print command received at the step S4, i.e., whether or not the page corresponding to the print command is a valid page (i.e. a page to be actually printed) or an invalid page (i.e. a page to be a blank page). If it is the valid page (step S6: YES), the operation flow branches to the step S7. On the other hand, if it is the invalid page (step S6: NO), the operation flow branches to the step S8. Incidentally, in the judgment at the step S6, if there is the segment of the received information between one page flag and its next page flag, the page indicated by the segment of the received information corresponding to this one flag is judged as the valid page. If there is no segment of the received information between these flags, the page indicated by the segment of the received information corresponding to this one flag is judged as the invalid page.

In case that either one of the FRONT flag and the BACK flag is updated (step S7), or in case that the page corresponding to the print command is the invalid page (step S6: NO), it is judged whether or not both of the FRONT flag corresponding to the front page of the record sheet and the BACK flag corresponding to the back page of the record sheet are "1" (step S8). Then, if both of these flags are "1" (step S8: YES), the segments of the received information developed on the reception buffer 4A corresponding to these flags are respectively recorded (i.e., printed) onto both sides of the record sheet (step S9). Then, the FRONT flag and the BACK flag in the flag storage area 4B are initialized again (step S10). Finally, the operation flow returns to the step S2 so as to perform the predetermined process for another segment of the received information for the next page.

On the other hand, if both of the FRONT flag and the BACK flag are not "1" (step S8: NO), the operation flow directly returns to the step S2.

Further, according to the judgment at the step S3, if the stop command is received (step S3: YES), it is judged whether or not either one of the FRONT flag and the BACK flag stored in the flag storage area 4B is "1" at the timing of receiving this stop command (step S11). If either one of them is updated to "1" (step S11: YES), the printing process is executed only as for the page corresponding to the updated flag (step S12), and each of these flags are initialized (step S13). Finally, the recording process is ended.

On the other hand, according to the judgment at the step S11, if none of these flags is updated to "1" (step S11: NO), the recording process is ended as it is.

Next, the mode selecting process and the recording process shown in FIG. 2 are more concretely explained with reference to FIG. 3.

First of all, the case where the saving mode is selected as the recording mode by the mode selection portion 11A in advance of the recording process is explained with reference to FIG. 2 and FIG. 3A.

At first, the initializations of the FRONT flag and the BACK flag are performed (step S1). Then, the predetermined process is performed with respect to one segment of the received information for a first page (P1) indicated by the received information as shown in FIG. 3A, which has been inputted from the host computer 5 for each page (step S2). Then, at the step S3, since the segment of the received information for the page P1 is being presently processed, the stop command is not received yet (step S3: NO), after the print command corresponding to the page P1 is received (step S4: YES), the recording mode is judged (step S5). Since the recording mode is the saving mode in the present case (step S5: YES), it is judged whether the page corresponding to the segment of the received information for the page P1 is the valid page or the invalid page (step S6). In FIG. 3A, since these is a character "A" in the page P1 indicated by the segment of the received information, the page P1 indicated by the segment of the received information is judged as the valid page (step S6: YES). Then, since the page P1 indicated by the segment of the received information is the front page, the FRONT flag is updated to "1" (step S7).

Next, at the step S8, since the FRONT flag is updated to "1" in the present case (step S8: NO), the operation flow returns to the step S2, so as to perform the predetermined process for another segment of the received information for a next page P2. Then, the processes in the steps S3, S4 and S5 are completed as for the page P2 indicated by the segment of the received information. At the step S6, the page P2 indicated by the segment of the received information is the blank page as shown in FIG. 3A i.e. the invalid page (step S6: NO). Thus, the operation flow directly branches to the step S8. Then, at the step S8, since only the FRONT flag is updated to "1" (step S8: NO), the operation flow returns to the step S2 so as to perform the predetermined process for another segment of the received information for a next page P3. Then, the processes in the steps S3, S4 and S5 are completed as for the segment of the received information for the page P3. At the step S6, the page P3 indicated by the segment of the received information is the blank page as shown in FIG. 3A i.e. the invalid page (step S6: NO). Thus, the operation flow directly branches to the step S8. Then, at the step S8, since only the FRONT flag is updated to "1" (step S8: NO), the operation flow returns to the step S2 so as to perform the predetermined process for another segment of the received information for a next page P4.

Then, the processes in the steps S3, S4 and S5 are completed as for the segment of the received information for the page P4. At the step S6, since these is a character "B" in the page P4 indicated by the segment of the received information as shown in FIG. 3A, the page P4 indicated by the segment of the received information is the valid page (step S6: YES). Then, the BACK flag, which has never been updated, is now updated to "1" (step S7). Next, at the step S8, since both of the FRONT flag and the BACK flag are updated to "1" in the present case (step S8: YES), the pages P1 and P3 indicated by the respective segments of the received information, which presently correspond to the FRONT flag and the present BACK flag respectively, are recorded onto both sides of the record sheet respectively (step S9). Then, these two flags are initialized (step S10), and the operation flow returns to the step S2 so as to perform the predetermined process for another segment of the received information for a next page P5.

Hereafter, the processes in the steps S2 to S10 are repeatedly performed in the same manner with respect to the pages P5 and P6 indicated by the respective segments of the received information, while each of these pages P5 and P6 is treated as the valid page. Then, the stop command is received at the step S3 (step S3: YES). Then, at the step S11, since neither one of the FRONT flag and the BACK flag is updated to "1" (i.e., both are "0") (step S11: NO), the recording process is ended as it is.

According to the above described recording process, from the segments of the received information in the information amount of 3 pages in total as shown in a left hand portion of FIG. 3A, an output result is obtained in which the pages corresponding to the segments of the received information for the pages P1, P4, P5 and P6 are recorded onto both sides of the record sheet (i.e. on 2 record sheets in total) as shown in a right hand portion of FIG. 3A.

Next, the case where the normal mode is selected as the recording mode by the mode selection portion 11A in advance of the record process is explained with reference to FIGS. 2 and 3B.

At first, the processes in the steps S1 to S4 explained in the case of FIG. 3A are performed with respect to one segment of the received information for a first page P1.

Then, at the step S5, since the recording mode is the normal mode in the present case (step S5: NO), the FRONT flag corresponding to the segment of the received information for the page P1 is updated to "1" (step S7).

Then, at the step S8, since only the FRONT flag is updated to "1" in the present case (step S8: NO), the operation flow returns to the step S2 so as to perform the predetermined process with respect to the segment of the received information for a next page P2. Then, after the processes in the steps S3, S4 and S5 are completed for the segment of the received information for the page P2, at the step S7, although the page P2 indicated by the segment of the received information is the blank page i.e. the invalid page, the BACK flag is updated to "1" (step S7). Then, at the step S8, since both of the FRONT flag and the BACK flag are updated to "1" (step S8: YES), the pages P1 and P2 indicated by the respective segments of the received information, which presently correspond to the FRONT flag and the BACK flag respectively, are recorded onto both sides of the record sheet (step S9). Then, these two flags are initialized (step S10), and the operation flow returns to the step S2 so as to perform the predetermined process for another segment of the received information for a next page P3.

Hereafter, the processes in the steps S2 to S5 and S7 to S10 are repeatedly performed in the same manner under an assumption that all of the pages corresponding to the segments of the received information for P3 to P6 are the valid page (although the page P3 indicated by the segment of the received information is in fact the invalid page). Then, the stop command is received at the step S3 (step S3: YES). Then, at the step S11, since either one of the FRONT flag and the BACK flag is not updated to "1" (i.e., both are "0") (step S11: NO), the recording process is ended as it is.

According to the above explained recording process, an output result is obtained in which the pages corresponding to the segments of the received information for the pages P1 and P4 are recorded (i.e., printed) onto the corresponding sides of the record sheet respectively, and the pages corresponding to the segments of the received information for the pages P5 and P6 are recorded (i.e., printed) onto both sides of the record sheet. Namely, the output result in the same form as the input indicated by the received information can be obtained.

In the above explained first embodiment, although either one of the normal mode and the saving mode is selected as the recording mode by the mode selection portion 11A of the operation panel 11, the recording mode may be selected as following. Namely, in the predetermined process for the received information at the step S2, it is judged whether or not control information to specify the recording mode i.e. the normal mode or the saving mode, is included in the received information inputted from the host computer 5. Then, if this control information specifying the recording mode is included in the received information from the host computer 5, the recording mode is predominantly set to the recording mode specified by this control information, in the printer apparatus 1 irrespective of the recording mode set in advance by the mode selection portion 11A of the operation panel 11 or by the previous control information. Alternatively, if the control information specifying the recording mode is not included in the received information from the host computer 5, the recording process is performed by the recording mode set in advance in the printer apparatus 1.

As described above, according to the mode selecting process in the first embodiment, either one of the normal mode and the saving mode can be selected in advance, as the recording mode for the case of detecting one segment of the received information which corresponds to the blank page. Thus, it is possible to select in advance either one of the normal mode and the saving mode on the basis of the user's intention, so that it is possible to prevent the received information from being recorded onto both sides of the record sheet against the user's intention, in case that the user intends to record the received information while leaving the blank page indicated by the received information as the blank page or surface of the record sheet.

Further, in case of recording the inputted blank page as the blank page as it is, it is possible to prevent the total page number indicated by the received information and the total page number of the actually recorded record sheets from being inconsistent with each other.

Furthermore, the received information inputted from the external is appended with the page flag indicating the segment of the received information, which corresponds to the information amount of one page. Thus, if there is no received information between two consecutive page flags, the received information corresponding to the interval between these two consecutive page flags is detected as the blank information indicating the blank page. In this manner, it is possible to certainly and reliably detect the blank information.

Furthermore, by selecting in advance either one of the both sides recording mode and the one side recording mode by the both sides/one side selection portion 11B, the record sheet can be saved by recording the received information onto both sides of the record sheet as the occasion demands according to the user's intention.

(III) Operation For Mode Selecting Process in Second Embodiment

Next, the operation for the mode selecting process and the record process in a second embodiment is explained with reference to a flow chart of FIG. 4.

In the above mentioned mode selecting process of the first embodiment, only the one side printing process is performed after the step S11. In contrast to this, in the mode selecting process of the second embodiment, the printing process is executed as the both sides printing process after the step S11.

Figure 4:
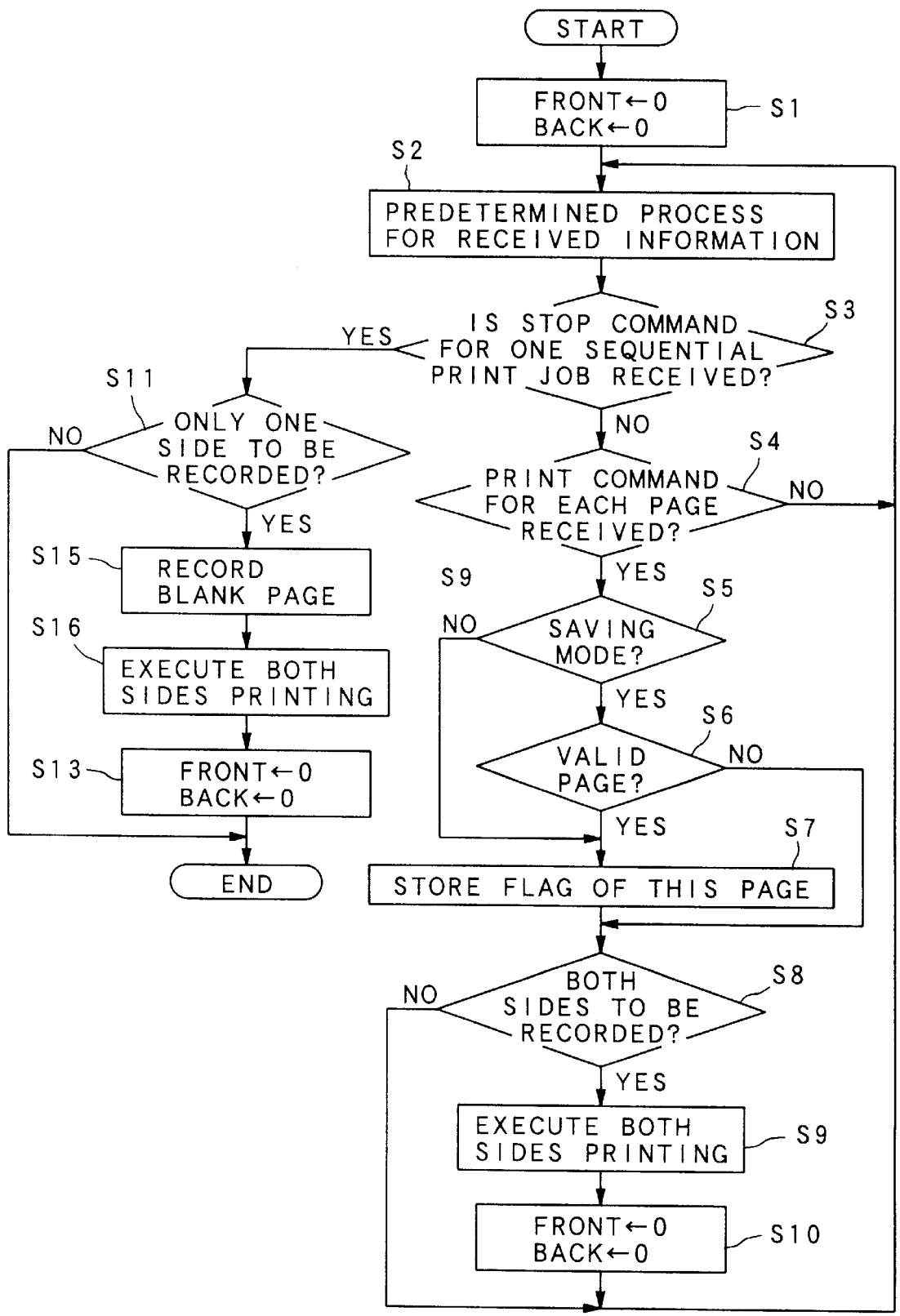
FIG. 4 is a flow chart showing a mode selecting process and a recording process in a second embodiment of the present invention.

In FIG. 4, the same steps as those in FIG. 2 carry the same step numbers and the explanations thereof are omitted.

In the mode selecting process of the second embodiment shown in FIG. 4, as for the steps S1 to S10, the same processes as those in the first embodiment are performed.

At the step S3, if the stop command is received (step S3: YES), the process in the step S11 is performed. Then, if either one of the flags is updated to "1" (step S11: YES), another flag which is not updated is set to "1" (step S15) so as to record a blank page. Then, the both sides recording process corresponding to these two flags (i.e. the only one side recording process in practice) is executed (step S16). Then, the process in the step S13 is performed and the recording process is ended.

On the other hand, according to the judgment at the step S11, if neither one of the flags is updated to "1" (step S11: NO), the recording process is ended as it is.

This mode selecting process of the second embodiment is such a process that, in case that the stop command is erroneously received in the middle of the reception of the information inputted from the external although the information for one sequential print job is still continuously being received, the recording process is ended after the received information until the information, which is nextly received after the stop command, is recorded onto both sides of the record sheet.

According to the mode selecting process of the second embodiment, in addition to the advantageous effect of the mode selecting process of the first embodiment, it is possible to end the recording process after the segment of received information for the last page is recorded onto the record sheet even if the stop command is erroneously received in the middle of the reception of the information inputted from the external.

In the above explained second embodiment, although either one of the normal mode and the saving mode is selected as the recording mode by the mode selection portion 11A of the operation panel 11, the recording mode may be selected as follows. Namely, in the predetermined process for the received information at the step S2, it is judged whether or not control information to specify the recording mode i.e. the normal mode or the saving mode, is included in the received information inputted from the host computer 5. Then, if this control information specifying the recording mode is included in the received information from the host computer 5, the recording mode is predominantly set to the recording mode specified by this control information, in the printer apparatus 1 irrespective of the recording mode set in advance by the mode selection portion 11A of the operation panel 11 or by the previous control information. Alternatively, if the control information specifying the recording mode is not included in the received information from the host computer 5, the recording process is performed by the recording mode set in advance in the printer apparatus 1.

In each of the above described embodiments, the case where the record information is inputted from the host computer 5 has been explained. However, it is not limited to this. For example, the present invention can be adapted to the record information which is inputted from a communication apparatus such as a facsimile apparatus or the like.

In each of the above described embodiments, the case where the mode selection is performed by the operation panel 11 of the printer apparatus 1 has been explained. However, it is not limited to this. For example, the mode selection (i.e., the selection as for the normal mode or the saving mode, and/or the both sides recording mode or the one side recording mode) may be performed by the control information specifying the mode outputted from the host computer 5.

The present invention can be adapted to a printer engine of so-called ink jet type as well as the laser printer engine by use of the laser beam.

Further, in each of the above described embodiments, the case where the present invention is adapted to the printer apparatus has been explained. However, it is not limited to this. For example, the present invention can be adapted widely to an apparatus for recording the record information from an external processing device such as the computer, the facsimile apparatus and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus for receiving information from an external device and recording the received information onto a predetermined record sheet, said apparatus comprising:

a detection device that detects whether the received information of one page is blank information;

a mode designating device that designates, in advance of a recording process, one of a first mode and a second mode, wherein in the first mode when said detection device detects that the received information of one page is the blank information, a recording operation is operated for the received information of one page as a blank page, and wherein in the second mode when said detection device detects that the received information of one page is the blank information, the recording operation is not operated for the received information of one page and the recording operation is operated for the received information of a next page, which is next to the received information of the one page and is not the blank information, the mode designating device including:

a mode selecting operation member that is manually operable to select one of the first mode and the second mode, a mode control information detector that detects whether or not mode control information, which indicates one of the first mode and the second mode to be selected, is appended to received information received from the external device, a mode determiner that determines one of the first mode and the second mode, prior to a recording operation, in accordance with the detected mode control information if mode control information is detected by the mode control information detector, and alternatively determines one of the first mode and the second mode in accordance with the mode selected by the mode selecting operation member if mode control information is not detected by the mode control information detector; and a recording process device that operates the recording operation according to one of the first mode and the second mode which is determined by said mode designating device when the blank information is detected by said detection device.

2. An apparatus according to claim 1, wherein the received information is appended with an indicator indicating a segment of the received information of one page, and said detection device detects that the received information between two consecutive indicators is the blank information if the received information to be recorded does not exist between said two consecutive indicators.

3. An apparatus according to claim 1, wherein said recording process device comprises a both sides recording device for recording the received information onto both sides of the record sheet.

4. An apparatus according to claim 3, wherein said recording process device further comprises a one side recording device for recording the received information onto only one side of the record sheet, and said apparatus further comprises a both sides/one side selection device for selecting, in advance of the recording operation, one of said both sides recording device and said one side recording device.

5. An apparatus according to claim 1, wherein the information is inputted from an external 1, computer device, and said apparatus further comprises an I/O (Input/Output) interface for inputting the information from said external computer device into said apparatus.

6. An apparatus according to claim 1, wherein the information is inputted from an external communication device, and said apparatus further comprises an I/O (Input/Output) interface for inputting the information from said external communication device into said apparatus.

7. An apparatus according to claim 1, further comprising a buffer memory device for temporarily storing the received information, said detection device detecting whether the received information which is stored in said buffer memory device is the blank information.

8. An apparatus according to claim 1, further comprising a flag storage device for storing a flag indicating a detection result of said detection device, said recording process device operating the recording operation on the basis of the flag stored in said flag storage device.

9. An information recording apparatus for receiving information from an external device and recording the received information onto a predetermined record sheet, said apparatus comprising:

detection means for detecting whether the received information of one page is blank information;

mode designating means for designating, in advance of a recording process, one of a first mode and a second mode, wherein in the first mode when said detection device detects that the received information of one page is the blank information, a recording operation is operated for the received information of one page as a blank page, and wherein in the second mode when said detection device detects that the received information of one page is the blank information, the recording operation is not operated for the received information of one page and the recording operation is operated for the received information of a next page, which is next to the received information of the one page and is not the blank information, the mode designating means including:

mode selecting operation means, that is manually operable, for selecting one of the first mode and the second mode, mode control information detector means for detecting whether or not mode control information, which indicates one of the first mode and the second mode to be selected, is appended to received information received from the external device, mode determiner means for determining one of the first mode and the second mode prior to a recording operation, in accordance with the detected mode control information if mode control information is detected by the mode control information detector means, and alternatively determines one of the first mode and the second mode in accordance with the mode selected by the mode selecting operation means if mode control information is not detected by the mode control information detector means; and recording process means for operating the recording operation according to one of the first mode and the second mode which is determined by said mode designating means when the blank information is detected by said detection means.

* * * * *